United States Patent [19]

Green et al.

[11] 4,427,486

[45] Jan. 24, 1984

[54] APPARATUS FOR MOUNTING TRANSPARENCY FILM

[75] Inventors: Lawrence E. Green, Burlington; Richard R. Wareham, Marblehead, both of Mass.

[73] Assignee: Polaroid Corporation, Cambridge, Mass.

[21] Appl. No.: 334,088

[22] Filed: Dec. 24, 1981

[51] Int. Cl.$^{3}$ .............................................. B32B 31/18

[52] U.S. Cl. ...................................... 156/517; 40/152; 40/158 B; 156/522

[58] Field of Search ............... 156/517, 521, 522, 108, 156/443; 40/152, 158 B; 53/435, 520

[56] References Cited

U.S. PATENT DOCUMENTS

| | | | |
|---|---|---|---|
| 2,477,470 | 7/1949 | Williams | 40/158 |
| 2,839,211 | 6/1958 | Fairbanks et al. | 156/517 |
| 3,248,846 | 5/1966 | Engelstein | 53/520 |
| 3,470,642 | 9/1969 | Mundt et al. | 40/152 |
| 3,819,448 | 6/1974 | Reever | 156/522 |
| 4,172,003 | 10/1979 | Bachelder et al. | 156/517 |
| 4,256,527 | 3/1981 | Green | 156/443 |

*Primary Examiner*—Caleb Weston

*Attorney, Agent, or Firm*—Alfred E. Corrigan

[57] ABSTRACT

A manually operable, compact apparatus for sequentially cutting sections of film, each of which includes a visible photographic image and mounting the same in a frame for subsequent use in a projector or viewer. The apparatus is specifically adapted for use with frames of the type which have a pair of open-ended guides for receiving the film. The apparatus includes structure for supporting the frame at an acute angle relative to a plane containing the path of movement of an advancing section of film. By so inclining the frame relative to the path of movement of the film, the leading edge of the advancing film is deflected by a portion of the frame in a predetermined direction and along a well-defined path into the open end of each of the two film guides. The apparatus also includes means for maintaining a trailing edge portion of the section of film to be mounted in a generally horizontal plane during the deflection of the film's leading edge. Accordingly, after the leading edge of the film bottoms out at the closed end of each guide, and the trailing edge is severed from the remainder of the roll of film, the trailing edge moves in a direction to relieve the stresses in the severed section caused by the deflection of the leading edge of the film. This latter movement results in the trailing edge of the severed section being automatically located in operative relation with the aforementioned frame portion.

3 Claims, 7 Drawing Figures

APPARATUS FOR MOUNTING TRANSPARENCY FILM

RELATED APPLICATION

This application is related to application Ser. No. 334,087 entitled "Frame for Transparency Film", filed on even date herewith, by Nolan A. Drevitch et al.

BACKGROUND OF THE INVENTION

1. Field of the Invention

This invention relates to manually operable apparatus for mounting a photographic film transparency in a frame.

2. Description of the Prior Art

This invention relates to an apparatus for mounting film transparencies in individual frames and, more particularly, the apparatus is specifically adapted for use with frames of the type which have a pair of open-ended guides for directing the film into its operative position relative to the frame. The prior art is replete with apparatus of the type described. For example, reference is made to U.S. Pat. No. 3,470,642 wherein is shown apparatus which deforms a frame during the positioning of a film transparency therein by expanding the frame's insertion slit. While such expansion increases the chances that the leading edge of the transparency will "see" the slit and accordingly will enter it, the apparatus also subjects the frames to possible permanent deformation or breakage.

Another end loading type of apparatus is shown in U.S. Pat. No. 4,172,003 wherein a preselected section of an image is severed from a photograph and moved, end-wise, into an open-ended frame. Here, the problem of the leading edge of the severed section "seeing" the insertion slit or open end of the frame is heighten. Since the depth of the insertion slit is limited by the thickness of the frame, it is difficult for the leading edge of the severed portion to "see" it. Put another way, as viewed in FIG. 4 of the '003 patent, the depth of the insertion slit, as projected onto a vertical plane, is substantially equal to the thickness of the leading edge of the severed section of film. Therefore, moving the leading edge of the section into the slit is akin to threading a needle. Accordingly, the apparatus must be carefully formed in order to insure that the severed section will be properly guided into the frame.

Still another type of apparatus is shown in U.S. Pat. No. 4,256,527. In this apparatus the film is advanced, leading edge first, toward a station at which a frame is supported in a plane which is generally parallel to a plane defined by the path of movement of the advancing film. The apparatus includes a pair of inclined surfaces which are adapted to deflect the leading edge of the film as it moves into superposition with a frame piece such that its corners slide under a pair of triangularly-shaped retainers located on the frame piece. Thereafter, the film is cut or severed from the remainder of the roll of film and a second frame piece is secured in superposition to the aforementioned frame piece thereby sandwiching the transparency therebetween. Again, since the leading edge of the advancing film cannot "see" the openings defined by the retainers and the frame prior to being deflected, the placement of the inclined surfaces is critical. If they are placed higher than the path of movement of the advancing film, the leading edge of the film will not be deflected. Further, the film is not supported between the inclined surfaces and the anvil of the apparatus. Should this distance be too great, the leading unsupported edge of the film may droop to a point where it will not engage the inclined surfaces.

SUMMARY OF THE INVENTION

The present invention relates to manually operable, compact apparatus for mounting photographic transparencies, e.g., of the 35 mm type, in individual frames. More particularly, the apparatus includes a frame loading section which is constructed to support a frame of the end-loading type in position to receive a portion of film containing a complete, visible photographic image. At one end the apparatus includes a recessed section for receiving a conventional 35 mm film cassette containing therein a roll of processed transparency film. The recessed section is configured such that the film cassette can only be placed therein with the emulsion side of the film facing upwardly as it is being withdrawn from the film cassette thus keeping the emulsion out of frictional engagement with components of the apparatus. The apparatus also includes a manually operable roller having a plurality of cogs thereon which during rotation of the roller are adapted to enter the sprocket holes in the film so as to advance a leading edge of the film under a laterally spaced pair of depressors or restraints, across an anvil and into engagement with a frame located at the aforementioned frame loading section. This section is adapted to support a portion of the frame in the path of travel of the advancing film as well as at an acute angle to a plane defined by this path of travel. The frame includes a pair of laterally spaced longitudinally extending ramp surfaces each of which leads to an open end of a longitudinally extending film guide. The ramp surfaces are bordered at their outwardly facing edges by vertical walls which have a maximum spacing therebetween substantially equal to the width of a transparency.

The spatial relation of the frame to the advancing film is such that the ability of the leading edge of the film to "see" the relatively thin open ends of the guides has been greatly enhanced. In other words, the effective height of each opening, as projected onto a vertical plane, is, in a manner of speaking, increased by the height of each ramp surface, as projected onto the same plane. Accordingly, as long as the leading edge of the advancing film strikes the frame at a location between the top of each open end of the guide and the bottom of each ramp surface, it will "see" the open ends of the guides, i.e., it will enter the open ends upon further advancement of the film.

When the leading edge of the film engages the ramp surfaces of the frame, it is deflected upwardly, at an acute angle to a plane in which the leading edge was traveling, into the open ends of the guides. This deflection results in stresses being placed within the film because the depressors or restraints are, at this time, maintaining a trailing edge of the portion of film being mounted in the previously described plane of movement. After the leading edge of the film bottoms out at the closed end of each of the guides, a blade is manually actuated to sever the film along a line corresponding to its trailing edge. The trailing edge then automatically snaps or moves into its operative relation with the frame as it, the severed portion of film, naturally returns to its unstressed condition. Thereafter, another portion of the frame is moved into superposition with the transparency to releasably secure it in its operative relation to the frame.

An object of the invention is to provide an apparatus which positions a transparency film frame so as to enhance the chance of the transparency entering a pair of open-ended guides in the frame.

Another object of the invention is to provide an apparatus of the type described with means for maintaining a trailing edge of a transparency in a stressed condition until it is severed whereupon it will automatically spring into its operative position relative to a transparency frame as it returns to an unstressed condition.

Other objects of the invention will in part be obvious and will in part appear hereinafter.

The above-mentioned and other features and objects of the invention and the manner of attaining them will become more apparent and the invention itself will be best understood by reference to the following detailed description of the invention taken in connection with the accompanying drawings.

DETAILED DESCRIPTION OF THE INVENTION

Figure 1:
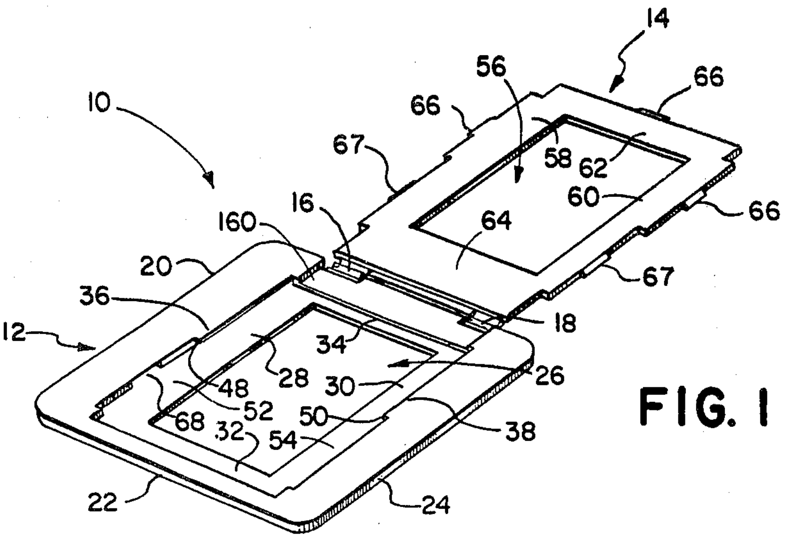
FIG. 1 is a perspective view of a frame for a film transparency which is adapted for use with the apparatus of the instant invention.
Figure 2:
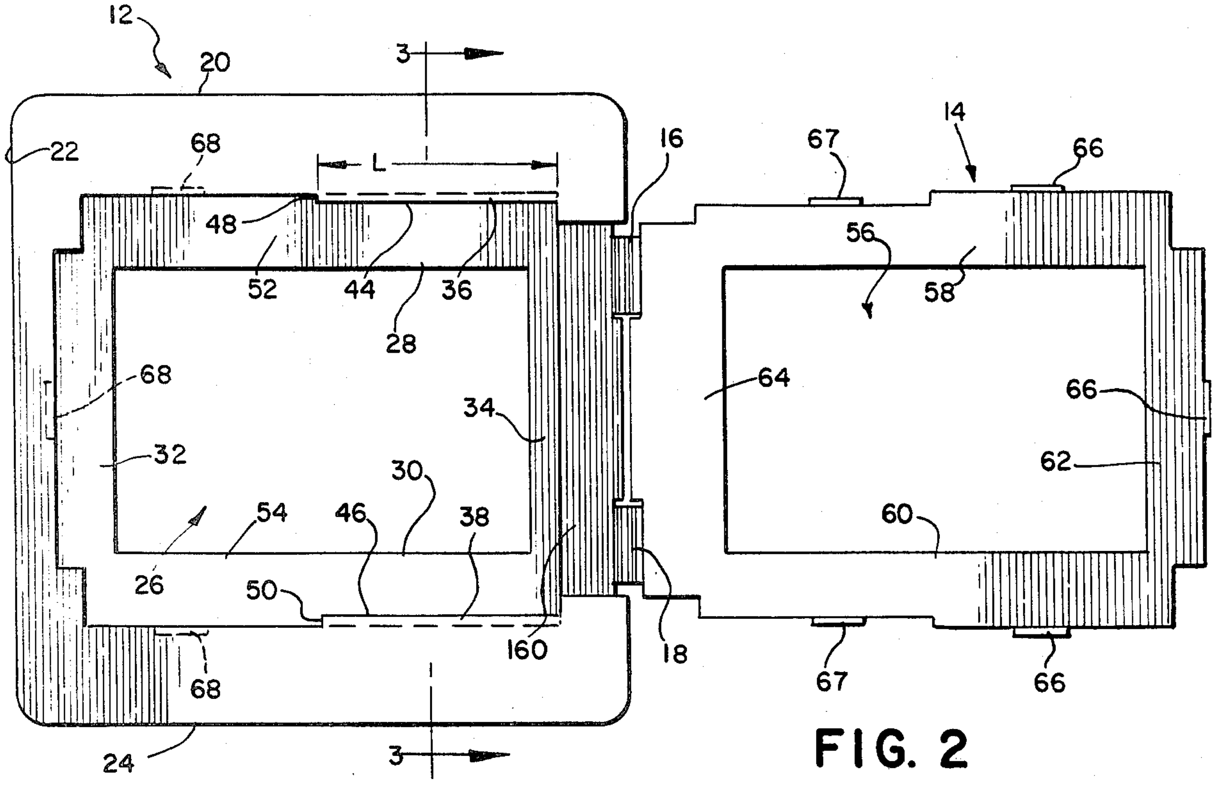
FIG. 2 is an enlarged plan view of the frame shown in FIG. 1.
Figure 3:
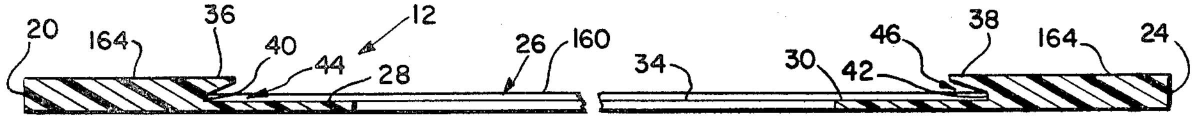
FIG. 3 is an enlarged cross-sectional view of the frame shown in FIG. 2, taken generally along the line 3—3 of FIG. 2.

Reference is now made to FIGS. 1–3 wherein is shown a unitary frame 10 which is adapted to support a photographic film transparency, e.g., of the common 35 mm size, and which is adapted for use with the apparatus of the instant invention. The frame 10 is preferably molded from a plastic material, e.g., styrene, and is comprised of first and second frame sections 12 and 14, respectively, which are integrally connected to each other by a hinge consisting of hinge sections 16 and 18. The hinge sections 16 and 18 enable the first and second frame sections 12 and 14 to be moved from a transparency loading position, as shown in FIGS. 1 and 2 wherein the frame sections 12 and 14 are located end-to-end, to an operative transparency supporting position wherein the second frame section 14 has been rotated into superposition with the first frame section 12 and, preferably, lies within a plane containing the first frame section. So positioned, the frame 10 has a periphery defined in part by the hinge, and by edges 20, 22 and 24 which present substantially uninterrupted surfaces to a transparency frame changing apparatus.

Figure 4:
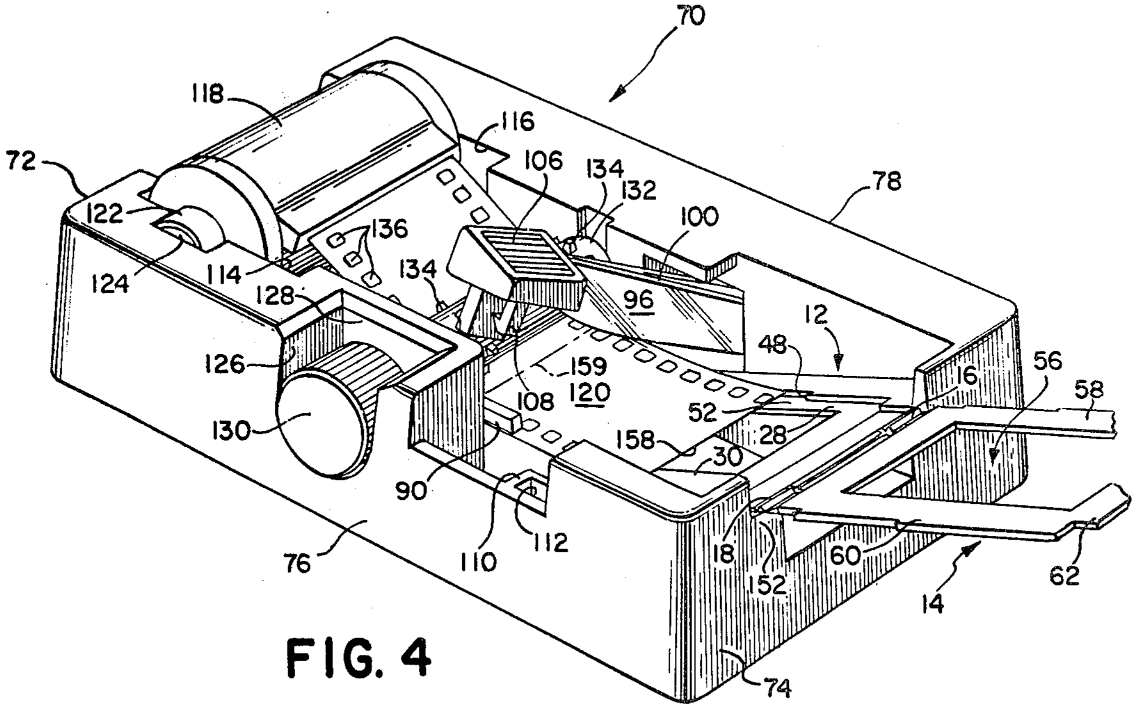
FIG. 4 is a perspective view of the apparatus of the instant invention with a transparency being mounted in a frame of the type shown in FIGS. 1–3.
Figure 6:
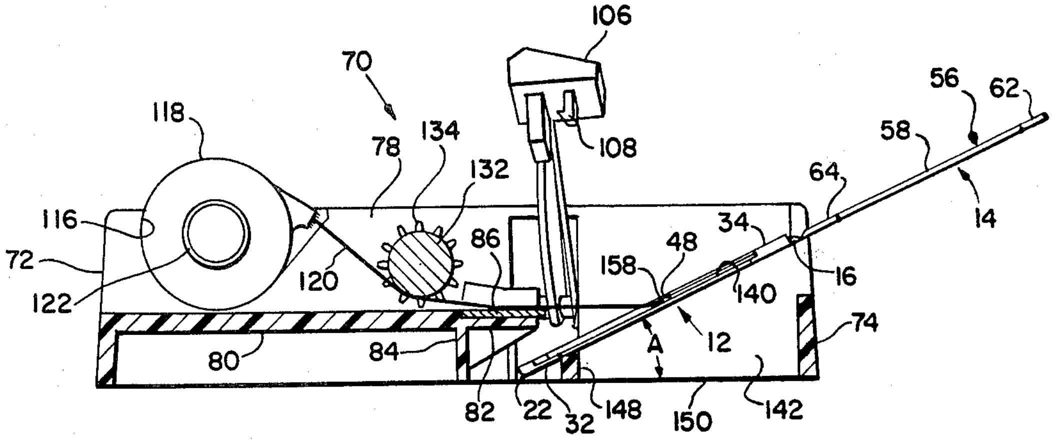
FIG. 6 is a longitudinal cross-sectional view of the apparatus shown in FIGS. 4 and 5.
Figure 7:
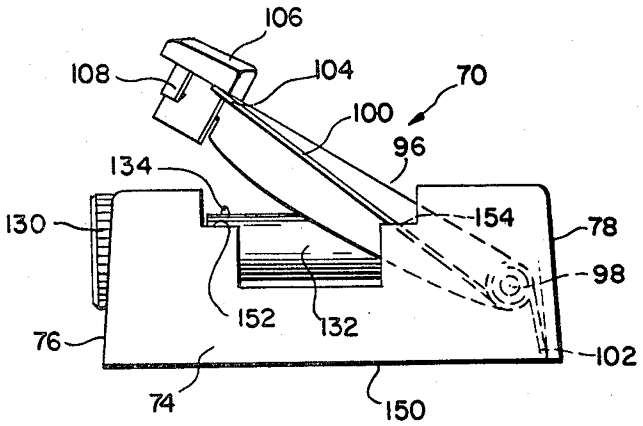
FIG. 7 is an end view of the apparatus shown in FIGS. 4–6.

The first frame member 12 has a generally rectangular configuration and a correspondingly shaped aperture 26 which is surrounded or bordered by a recessed portion including a pair of spaced parallel sides 28 and 30 the ends of which are interconnected by a pair of transversely extending sides 32 and 34. The parallel sides 28 and 30 of the border are adapted to support the parallel sides of a film transparency, as shown in FIGS. 4 and 6. The first frame member 12 also includes a pair of longitudinally extending flanges 36 and 38, each of which has a length L substantially less than that of the underlying side 28 and 30, respectively, and is preferably approximately equal to one-half the length of the underlying parallel side of the first frame member 12. The flanges 36 and 38 also extend from a line adjacent the outermost edges 40 and 42 of the parallel sides 28 and 30, respectively, toward each other and over portions of the underlying parallel sides 28 and 30 so as to define therewith a pair of guides 44 and 46 having open ends 48 and 50, respectively. The guides 44 and 46 have a maximum lateral spacing therebetween, as measured between the edges 40 and 42, which is substantially equal to the width of a transparency which is to be mounted within the frame 10. Thus, there are portions 52 and 54 of the parallel sides 28 and 30 which are not covered by the flanges 36 and 38 and which extend forwardly of the open ends 48 and 50 to a point where they merge with the transversely extending side 32 of the first frame member 12.

The second frame member 14 also has a generally rectangular configuration with a similarly configured aperture 56 centrally located therein. The aperture 56 is bordered or defined by a pair of spaced longitudinally extending sides 58 and 60 which are interconnected at their opposite ends by a pair of transversely extending ends 62 and 64. The periphery of the second frame member 14 is provided with a plurality of male connectors 66 which are adapted to be releasably received by correspondingly configured female connectors 68 in the first frame member 12 and a pair of projections 67 which are adapted to snap under the flanges 36 and 38 so as to maintain the two frame members in the operative transparency supporting position previously described. The second frame member 14 has length, width, and thickness dimensions which are less than the corresponding dimensions of the first frame member 12 and these values are selected such that the second frame member 14 preferably lies within a volume defined by the first frame member 12, when in the operative position.

Reference is now made to FIGS. 4–7 wherein is shown a preferred form of an apparatus 70 for use with the frame 10. The apparatus 70 is intended to withdraw a length of roll film from a film cassette, move it into operative relation to the frame 10, and then sever the length of film associated with the frame 10 from the remainder of the film so as to enable further manipulation of the frame to secure the severed film within the frame.

Figure 5:
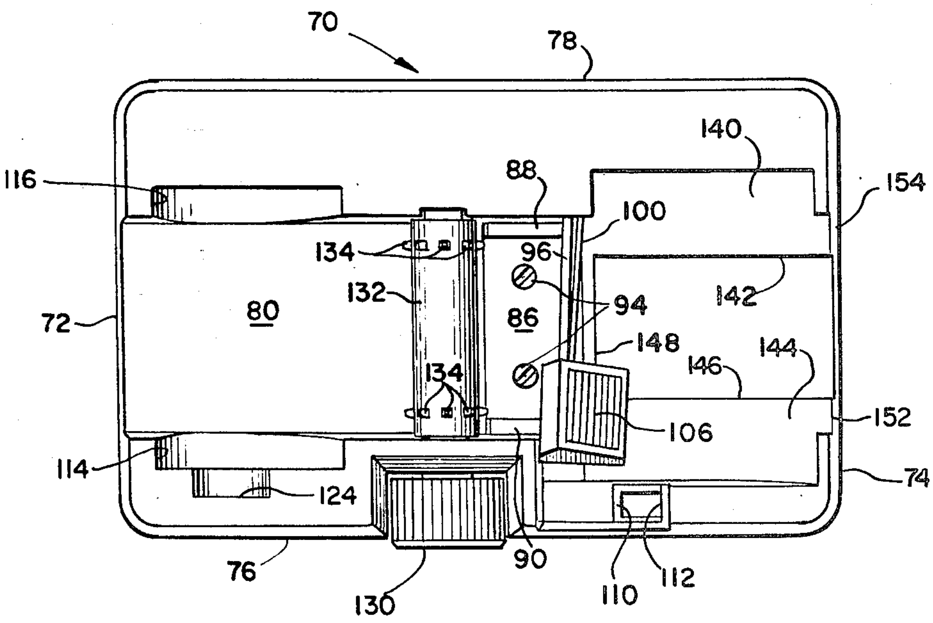
FIG. 5 is a plan view of the apparatus shown in FIG. 4.

The apparatus 70 generally takes the form of a truncated four-sided pyramid, preferably molded from a suitable plastic material. The apparatus 70 includes a pair of longitudinally spaced end walls 72 and 74 which are interconnected at their opposite ends by a pair of laterally spaced side walls 76 and 78. A generally horizontal platform 80 extends laterally from the side wall 76 to the side wall 78 and longitudinally from the end wall 72 to a transversely extending member having a generally horizontal flange 82 and a vertical flange 84. An anvil 86 is mounted between a pair of film depressors 88 and 90 and is secured to the horizontal flange 82 by a pair of screws 94. A blade 96 has one of its ends pivotally connected to the side wall 78 by a pin 98 and is resiliently biased into the position shown in FIGS. 4–7 and into engagement with an edge of the anvil 86 by a spring 100 which has one of its ends 102 coiled about the pin 98 and then secured against the side wall 78 and its other end 104 secured to a manually operative button 106 located on the free end of the blade 96. The button 106 includes a latch 108 which is adapted to engage the underside of a flange 110 which extends inwardly from the side wall 76 so as to secure the blade in the horizontal position when not in use. As best seen in FIG. 5, the button 106 and its integral latch 108 (not shown) are located to the left of the flange 110 and accordingly the button 106 is urged to the right against the bias of the spring 100 so as to permit the latch to enter an aperture 112, defined in part by the flange 110, and engage the underside of the flange 110.

The side walls 76 and 78 are provided with recesses 114 and 116 so as to receive the opposite ends of a conventional 35 mm film cassette 118. The cassette 118 preferably contains a length of instant type transparency film 120 which has been previously photographically exposed, developed, and rewound onto a film spool, an end of which is shown at 122 located within an extension 124 of the recess 114. It will be noted from an inspection of FIGS. 4 and 5 that the film cassette 118 cannot be placed within the apparatus 70 with the end of the film spool 122 facing in a direction opposite than that shown because the recess 116 is not configured to receive it. Therefore, this insures that the orientation of the film cassette 118 with respect to the apparatus 70 will be such that the emulsion side of the film will always face upwardly, as shown in FIGS. 4 and 6, and will not be in engagement with the anvil 86 during movement of the film.

The side wall 76 is provided with a recess 126, defined in part by a wall 128. The recess 126 is adapted to receive a cylindrically-shaped knob 130 which is fixedly attached to a journal (not shown) of a roller 132 for rotating the same. The journals of the roller 132 are rotatively supported within bearings (not shown) located in the wall 128 and in the side wall 78. Opposite ends of the roller 132 are provided with a row of cogs 134 which extend around the periphery of the roller 132 and which are adapted to enter apertures 136 in the film 120 so as to advance the latter to the right, as viewed in FIG. 4.

The right hand portion of the apparatus 70, as viewed in FIGS. 4–6, includes a frame loading section comprised of a pair of ramps, each of which extend from a point just to the right of a vertical plane containing the right edge of the anvil 86 to the end wall 74. One of the ramps includes a surface 140, which extends inwardly from the side wall 78, and a vertical wall 142, while the other ramp includes a surface 144 which extends inwardly from the side wall 76 and a vertical wall 146. The lower ends of each of the ramps are connected by a transverse reinforcing member 148. Each of the ramp surfaces 140 and 144 defines an angle A with the base 150 of the apparatus 70, which angle A is preferably between 20° and 30° and in the structure shown in FIG. 10 is 24°. In order to obtain the angle of 24°, the end wall 74 is recessed so as to provide a pair of shoulders 152 and 154 for supporting the hinge area of the frame 10.

In the operation of the apparatus 70, a frame 10 is positioned, as shown in FIGS. 4 and 6, such that the first frame member 12 is located on the ramp surfaces 140 and 144 with its peripheral edge 22 in engagement with a pair of stops 156 (only one being shown), which extend inwardly toward each from the side walls 76 and 78, and with its transversely extending side 32 being supported by the reinforcing member 148. This position of the frame members 12 and 14 is also referred to as the transparency loading position.

The operator then threads the end of the film 120 under the roller 132 while simultaneously rotating the knob 130 in a counterclockwise direction until the cogs 134 enter the apertures 136 in the sides of the film. Once engaged, the ends of the film cassette 118 may then be lowered into their respective recesses 114 and 116. Rotation of the knob 130 is again commenced in the counterclockwise direction until the film's leading edge 158 passes beneath the depressors 88 and 90 and then engages the portions 52 and 54 of the parallel sides 28 and 30 of the first frame member 12. Continued rotation of the roller 132 results in the leading edge 158 of the film 120 being deflected from its path of movement, i.e., a horizontal plane, upwardly along the surfaces of the portions 52 and 54 with lateral movement of the film 120 being restricted by the edges 40 and 42 of the depressed area of the first frame member 12, and with a trailing edge 159 of the image area of the film being maintained in the horizontal plane by the depressors 88 and 90. Thus constrained and supported, the leading edge 158 of the film 120 may now be guided upwardly until it can readily "see" the open ends 48 and 50 of the guides 44 and 46, respectively, despite their restricted depth. Accordingly, the leading edge 158 easily enters the open ends 48 and 50 of the guides 40 and 42 and is advanced therealong until it bottoms out at the end of the guides at a raised transversely extending surface 160. After the film bottoms out in the guides 44 and 46, the blade 96 is pivoted downwardly (it having previously been released for automatic movement into the position shown in FIG. 8) thereby severing a length of film 120 containing an individual visible scene along its trailing edge 159 from the remainder of the film. Upon severing the film, the severed or trailing edge automatically snaps downwardly into the recessed area of the first frame member 12 and, more particularly, it snaps or moves downwardly onto the transversely extending end 32. This snapping action is the result of the trailing edge 159 of the film 120 being located in a different plane from that containing the leading edge 158, and upon being severed moves in a direction so as to relieve the stresses placed in the film by the deflection of the leading edge. The second frame member 14 may now be grasped to remove the frame 10 with its associated severed section of film from the apparatus 70. Upon removal of the frame 10 from the apparatus 70, the operator pivots the second section 14 about the hinge sections 16 and 18 until it overlies the first frame section 12 and is located wholly within the recess thereof such that its exposed surface forms a continuation of the top surface 164 of the first frame member. In this position, known as the operative position, it functions to encompass or sandwich the severed position of film between it and the recessed area of the first frame portion 12. The second frame section 14 is releasably maintained in this position with its aperture 56 located in alignment with the aperture 26 by the connectors 66 and 68 and by the interaction between the connectors 67 and the flanges 36 and 38.

Since certain changes may be made in the above-described invention without departing from the scope thereof, it is intended that all matter contained in the above description or shown in the accompanying drawings shall be interpreted as illustrative and not in a limiting sense.

What is claimed is:

1. Manually operable, compact apparatus for sequentially cutting sections of a strip of film containing a plurality of visible, individual images, and mounting the same in individual frames for subsequent use in a slide projector, said apparatus comprising:

means for supporting a film cassette having therein a roll of film containing a plurality of sections, each of which contains a visible image, each section including spaced leading and trailing edges;

means for advancing a section of the film, leading edge first, along a first plane while simultaneously unwinding the film from the film cassette;

means for supporting a frame in the path of movement of the leading edge of the section of the film and at an acute angle to said first plane whereby the leading edge may engage the frame and be deflected in a direction toward and into a pair of open-ended guides formed in the frame;

means for maintaining the trailing edge of the section of the film in said first plane during the deflection of the leading edge, thereby stressing the section; and means for severing the trailing edge of the section of the film from the remainder of the strip of film whereby the section of the film returns to an unstressed condition as the severed trailing edge automatically snaps into engagement with the frame.

2. An apparatus as defined in claim 1 wherein said frame supporting means defines an angle with said first plane of between twenty and thirty degrees.

3. An apparatus as defined in claim 2 wherein said severing means includes an anvil and said means for supporting a film cassette includes means for receiving the film cassette in only one orientation thereby insuring that the emulsion side of the film does not engage said anvil.

* * * * *